US006691005B2

(12) United States Patent
Proulx

(10) Patent No.: US 6,691,005 B2
(45) **Date of Patent: *Feb. 10, 2004**

(54) REMOTE CONTROL SYSTEM FOR A LOCOMOTIVE WITH SOLID STATE TILT SENSOR

(75) Inventor: Richard Proulx, Pierrefonds (CA)

(73) Assignee: Canac Inc., St-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/236,235

(22) Filed: Sep. 6, 2002

(65) Prior Publication Data

US 2003/0144771 A1 Jul. 31, 2003

Related U.S. Application Data

(63) Continuation of application No. 10/062,864, filed on Jan. 31, 2002, now Pat. No. 6,470,245.

(51) Int. Cl.[7] .................................................. G05D 1/00
(52) U.S. Cl. ...................................... 701/19; 246/187 A
(58) Field of Search ......................... 701/19; 246/187 A, 246/167 R; 104/295

(56) References Cited

U.S. PATENT DOCUMENTS

| | | | | |
|---|---|---|---|---|
| 5,511,749 A | 4/1996 | Horst et al. | ............. | 246/187 A |
| 5,685,507 A | 11/1997 | Horst et al. | ............. | 246/187 A |
| 5,817,934 A | 10/1998 | Skantar | ........................ | 73/121 |
| 6,300,933 B1 | 10/2001 | Nagasaki et al. | ........... | 345/685 |
| 6,470,245 B1 | 10/2002 | Proulx | ......................... | 701/19 |

FOREIGN PATENT DOCUMENTS

| | | |
|---|---|---|
| EP | 1 158 377 A | 11/2001 |
| JP | 08265881 | 3/1995 |

OTHER PUBLICATIONS

Analog Devices; Low Cost+ 2g Dual Axis; iMEMS Accelerometer with Digital Output; ADXL202; World Wide Web Site: http: www.analog.com; Analog Devices, Inc. 1998.
Horton et al., "A dual–axis tilt sensor based on micromachined accelerometers," *Sensors*, pp. 91–94 (Apr. 1996).
Jachman, John J., "Using piezoresistive accelerometers for automotive road testing," *Sensors*, pp. 40–47 (May 1990).
Link, Brian, "Field–qualified silicon accelerometers: from 1 milli g to 200,200 g," *Sensors*, pp. 28–33 (Mar. 1993).
Weinberg et al., "Using the ADXL202 accelerometer as a multifunction sensor (tilt, vibration and shock) in car alarms, "*Analog Devices—Technical Note* (Aug. 1998).

*Primary Examiner*—Marthe Y. Marc-Coleman
(74) *Attorney, Agent, or Firm*—Merchant & Gould, P.C.

(57) ABSTRACT

A portable master controller for a locomotive remote control system. The portable master controller has a user interface for receiving commands to control the movement of the locomotive. The user interface is responsive to operator commands to generate control signals. A processing unit receives the control signals from the user interface to generate digital command signals directing the movement of the locomotive. A transmission unit receives the digital command signals and generates a RF transmission conveying the digital command signals to the slave controller. A solid-state tilt sensor in communication with the processing unit communicates inclination information to the processing unit about the portable master controller. The processing unit receives and processes the inclination information. If the inclination information indicates that the portable master controller is in an unsafe operational condition, the processing unit generates an emergency digital command signal to the transmission unit, without input from the operator, for directing the locomotive to acquire a secure condition.

39 Claims, 3 Drawing Sheets

REMOTE CONTROL SYSTEM FOR A LOCOMOTIVE WITH SOLID STATE TILT SENSOR

This is a continuation of Ser. No. 10/062,864, filed Jan. 31, 2002, now U.S. Pat. No. 6,470,245, issued Oct. 22, 2002.

FIELD OF THE INVENTION

The present invention relates to an electronic system and components thereof for remotely controlling a locomotive. The system has a tilt sensor designed to operate in low temperatures often encountered in northern regions.

BACKGROUND OF THE INVENTION

Economic constraints have led railway companies to develop portable master controllers allowing a ground-based operator to remotely control a locomotive in a switching yard. The portable master controller has a transmitter communicating with a slave controller on the locomotive by way of a radio link. To enhance safety, the portable master controller carried by the operator is provided with a tilt-sensing device to monitor the spatial orientation of the portable master controller and determine occurrence of operator incapacitating events, such as the operator tripping and falling over objects and loss of conscience due to a medical condition, among others. When the tilt-sensing device reports that the portable master controller is outside the normal range of inclination, the portable master controller will automatically generate, without operator input, a command signal over the radio link to stop the locomotive.

Tilt-sensing devices used by prior art portable master controllers are in the form of mercury switches. Those have proven unreliable in cold temperature operations where the mercury bead in the switch can freeze and loose mobility. Attempts to overcome this drawback include adding thallium to the mercury to lower its freezing point. This solution, however, is objectionable because thallium is a toxic substance. Hence, for environmental reasons, thallium is very rarely used in the industrial community.

Against this background, the reader will appreciate that a clear need exists in the industry to develop a system and components thereof for remotely controlling a locomotive, featuring tilt-sensing devices that can reliably operate in very low temperatures and do not use mercury or thallium materials in their construction.

SUMMARY OF THE INVENTION

In one broad aspect, the invention provides a portable master controller for a locomotive remote control system. The portable master controller has a user interface for receiving commands to control a movement of the locomotive. The user interface is responsive to operator commands to generate control signals. The portable master controller includes a processing unit receiving the control signals from the user interface to generate digital command signals directing the movement of the locomotive. A transmission unit receives the digital command signals and generates a RF transmission conveying the digital command signals to the slave controller.

A solid-state tilt sensor in communication with the processing unit communicates inclination information to the processing unit about the portable master controller. The processing unit receives and processes the inclination information. If the inclination information indicates that the portable master controller is in an unsafe operational condition, the processing unit generates an emergency digital command signal to the transmission unit, without input from the operator, for directing the locomotive to acquire a secure condition.

By "solid-state" is meant a tilt sensor that does not uses a liquid to produce inclination information.

In a specific and non-limiting example of implementation, the solid-state tilt sensor includes a single axis accelerometer responsive to the acceleration of gravity. Optionally, the accelerometer is a multi-axis device responding to vertical acceleration and acceleration in at least another axis, as well. The ability to assess acceleration levels in axes other than the vertical axis permits detection of unsafe conditions that do not necessarily translate into an excessive inclination of the portable master controller.

The inclination information sent by the solid-state tilt sensor can be in any form as long as it allows the processing unit to detect an unsafe operational condition. The determination as to what is safe and what is unsafe can vary greatly according to the specific application. All the variants, however, include a common denominator, which is an assessment of the degree of inclination of the portable master controller. In addition to the assessment of the degree of inclination, other parameters may be taken into account, such as the time during which the portable master controller remains beyond a certain inclination angle, among others.

Once the occurrence of an unsafe operational condition has been detected, the processing unit generates an emergency command signal to direct the locomotive to acquire a secure condition. A "secure" condition is a condition in which the risk of accident from the locomotive is substantially reduced. An example of a secure condition is stopping the locomotive.

In a second broad aspect, the invention provides a remote control system for a locomotive including in combination the portable master controller defined broadly above and the slave controller for mounting on-board the locomotive.

In third broad aspect, the invention provides a portable master controller that uses an accelerometer to generate inclination information.

Under a fourth broad aspect, the invention provides a remote control system for a locomotive that has a portable master controller using an accelerometer to generate inclination information.

BRIEF DESCRIPTION OF THE DRAWINGS

A detailed description of examples of implementation of the present invention is provided hereinbelow with reference to the following drawings, in which.

Figure 1:
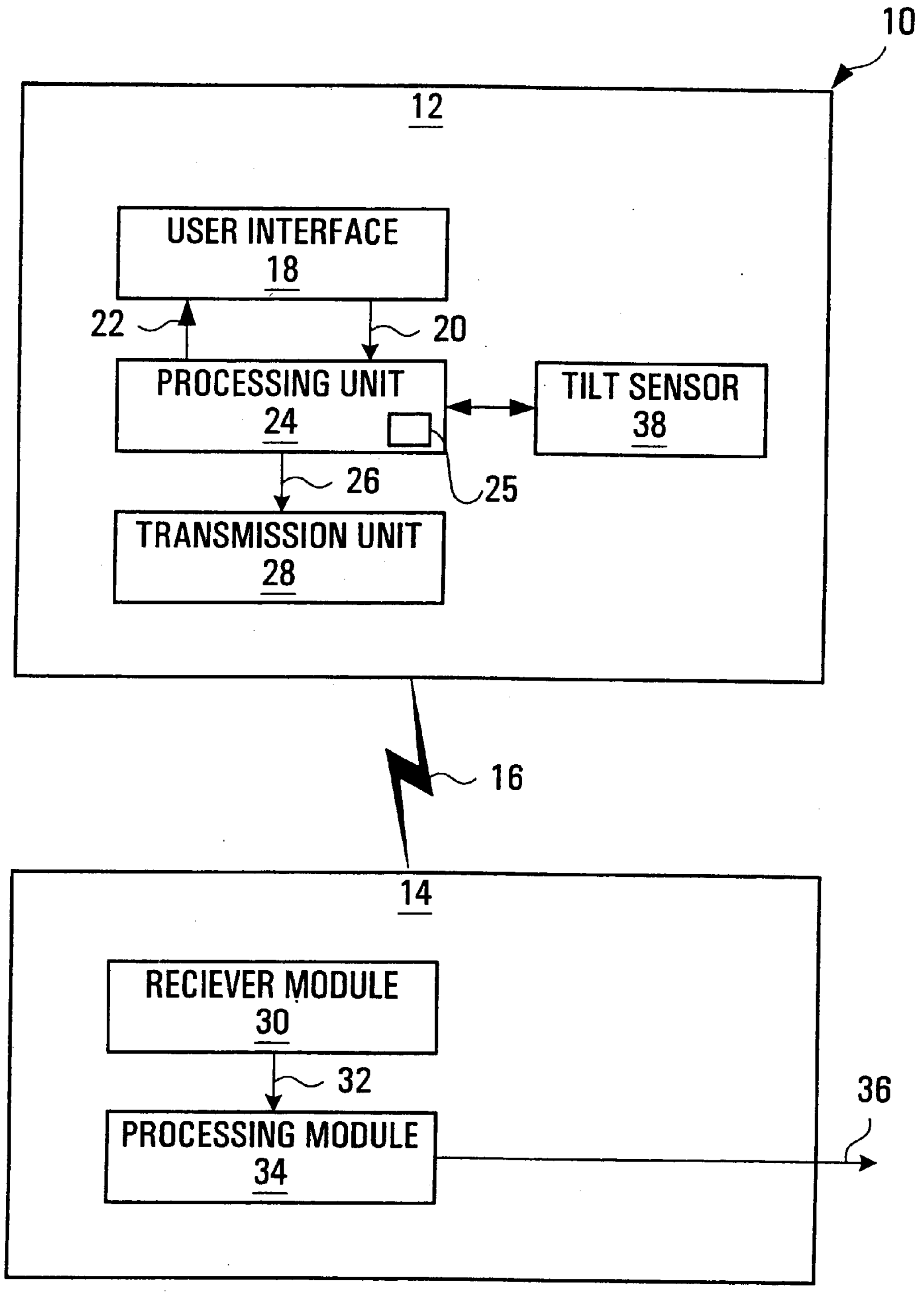
FIG. 1 is a functional block diagram of the remote control system for a locomotive according to a specific and non-limiting example of implementation of the invention.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 is a high-level block diagram of a remote control system 10 for a locomotive. The remote control system 10 includes a portable master controller 12 that is carried by a human operator. The system 10 also includes a slave controller 14 mounted on-board the locomotive (locomotive not shown in the drawings). The portable master controller 12 and the slave controller 14 exchange information over a radio link 16.

The portable master controller 12 includes a user-interface 18 through which the operator enters commands to control the movement of the locomotive. Such commands may include forward movement, backward movement, movement at a certain speed, coasting, stopping, etc. Optionally, the user interface 18 also conveys information to the operator, such as status information, alarms, etc. The user-interface 18 may comprise a variety of input mechanisms to permit the user to enter commands. Those input mechanisms may include electromechanical knobs and switches, keyboard, pointing device, touch sensitive surface and speech recognition capability, among others. Similarly, the user-interface 18 may comprise a variety of output mechanisms to communicate information to the user such as visual display or audio feedback, among others.

The user-interface 18 generates control signals 20, which represent the inputs of the operator. In instances where the user-interface 18 also communicates information to the operator, data signals 22 are supplied to the user-interface 18 from a processing unit 24, to be described below. The data signals convey the information that is to be communicated to the user.

The processing unit 24 receives and processes the control signals 20. The extent of the processing performed by the unit 24 will depend on the particular control strategy implemented by the system 10. At its output, the processing unit 24 will issue digital command signals 26 that direct the operation of the locomotive. Those command signals 26 represent commands, such as move forward, move backwards, stop, move at a selected speed, throttle command, brake command, among others.

The command signals 26 are supplied to a transmission unit 28 that generates a Radio Frequency (REF) transmission conveying those commands over the RF link 16 to the slave controller 14.

The slave controller 14 is comprised of a receiver module 30 for sensing the RF transmission over the RF link 16. The receiver module 30 generates at its output digital command signals 32 that are passed to a processing module 34 that processes those signals and issues local signals 36 that control the locomotive. The local signals 36 include, for example, throttle settings, brake settings, etc.

An important feature of the system 10 is a tilt sensor 38 that is part of the portable master controller 12. The tilt sensor 38 produces inclination information about the portable master controller 12 and sends this inclination information to the processing unit 24. The processing unit 24 will analyze this information to determine if the portable master controller 12 is in a potentially unsafe operational condition. In the affirmative, the processing unit 24 generates internally an emergency digital command signal directing the locomotive to acquire a secure condition. The digital command signal is sent to the slave controller via the transmission unit 28 and the radio link 16.

The inclination information processing strategy, which determines if the portable master controller 12 is in an operational condition that is safe or unsafe, can greatly vary and can take into account various parameters. One of those parameters is the degree of inclination of the portable master controller 12. In one example, the degree of inclination can be quantified in terms of angle of inclination. Another parameter is the time during which the portable master controller 12 is maintained at or beyond a certain degree of inclination. One possible strategy is to declare an unsafe operational condition only after a certain degree of inclination has been maintained for a predetermined time period, thus avoiding issuing the emergency digital command signal in cases where the operator moves his body in such a way that it will excessively tilt the portable master controller 12, but only for a moment.

The reader will appreciate that a wide variety of inclination information processing strategies are possible without departing from the spirit of the invention. All those strategies rely on the degree of inclination as parameter, alone or in combination with other parameters.

In a specific example of implementation, the tilt sensor 38 is an accelerometer that is responsive to static gravitational acceleration. By "static" it is meant that the accelerometer senses the force of gravity even when the portable master controller 12 is not moving vertically up or down. The accelerometer is mounted in the casing of the portable master controller 12 such that the axis along which the acceleration is sensed coincides with the vertical axis. When the portable master controller 12 is inclined, the component of the force of gravity along the vertical axis changes which allows determining the degree of inclination of the portable master controller 12.

Optionally, the accelerometer may also be sensitive about axes other than the vertical axis to detect abnormal accelerations indicative of potentially unsafe conditions that may not translate in an abnormal inclination of the portable master controller 12. Examples of such other abnormal accelerations arise when the portable master controller 12 (or the operator) is severely bumped without, however, the operator falling on the ground.

In a possible variant the tilt sensor 38 may include a plurality of accelerometers, each accelerometer being sensitive in a different axis.

When the tilt sensor 38 includes an accelerometer that outputs a signal having both a dynamic and a static component, it is desirable to filter out the dynamic component such as to be able to more easily determine or derive the orientation of the master controller 12. Techniques to filter out the dynamic component of the output signal are known in the art and will not be discussed here in detail.

If the processing unit 24 recognizes an unsafe operational condition, it issues an emergency command signal to secure the locomotive. One example of securing the locomotive includes directing the locomotive to perform to stop.

In a specific and non-limiting example of implementation the tilt sensor 38 is based on an accelerometer available from Analog Devices Inc. in the USA, under part number ADXL202. The output of the tilt sensor 38 is a pulse width modulated signal, where the width of the pulse indicates the degree of inclination.

Figure 4:
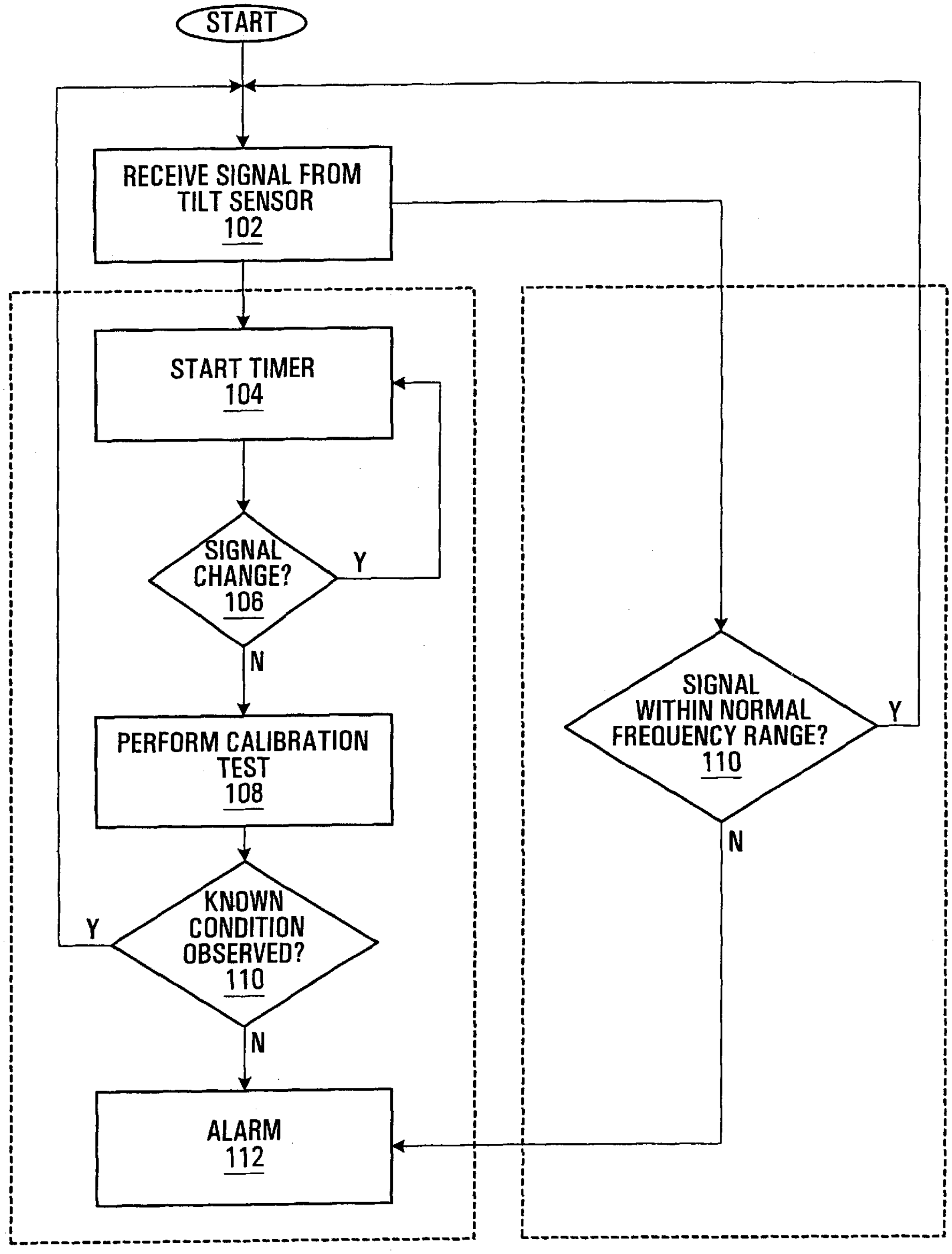
FIG. 4 is a flow chart illustrating a diagnostic procedure to identify a malfunction of the solid state tilt sensor.

For safety reasons, it is desirable for the processing unit 24 to determine when the tilt sensor 38 may be malfunctioning. At this end the processing unit 24 has diagnostic unit 25 that implements a diagnostic procedure. The diagnostic procedure runs continuously during the operation of the master controller 12. The flow chart of the diagnostic procedure is shown at FIG. 4. The procedure starts at step 100. At step 102 the signal from the tilt sensor 38 is received by the processing unit 24. The diagnostic procedure then performs two series of actions designed to confirm the proper operation of the tilt sensor 38 and the continued operation of the tilt sensor 38. The proper operation procedure will be described first. At step 104 a timer is started. The timer runs for a predetermined period of time. For example, this period of time can be from a couple of seconds to a couple of minutes. Decision step 26 detects changes in the output signal of the tilt sensor 38. If a change is noted, i.e., indicating a movement of the master controller 12, the timer 104 is reset. If no change is noted i.e., indicating a lack of master controller movement during the predetermined time period (the timer expires), the step 108 is initiated.

The step 108 verifies the integrity of tilt sensor 108 by performing a calibration test. This is effected by subjecting the tilt sensor 38 to a known condition that will produce a variation in the output signal. One possibility is to subject the tilt sensor 38 to a self-test which will induce a change in the output signal. Sending a control signal to a pin of the tilt sensor 38 initiates such self-test. At step 110, the processing unit 24 observes the output signal and if a change is noted, which indicates that no detectable malfunction is present, then processing continues at step 100. Otherwise, the conditional step 110 branches to step 112 that triggers an alarm. The alarm may be an audible, visual (or both) indication on the user interface 18 that a malfunction has been noted. Once the alarm at step 112 has been triggered, one possibility for the processing unit 24 is to generate an emergency digital command signal to the transmission unit 28 without input from the operator, for directing the locomotive to acquire a secure condition.

The continued operation procedure is performed at the same time as the proper operation procedure. The continued operation procedure includes a decision step 114 at which the output signal of the tilt sensor 38 is validated. In this example, the validation includes observing the signal to determine if it is within a normal range of operation. For example, when the output signal of the tilt sensor 38 is a pulse width modulated signal (PWM) the decision step 114 screens the signal continuously and if the frequency of the signal falls outside the normal range of operation of the tilt sensor 38 or the signal disappears altogether, a tilt sensor failure is declared. When such tilt sensor failure occurs, the alarm 112 is triggered and the locomotive brought to a secure condition, as described earlier.

It should be noted that the diagnostic procedure implemented by the processing unit 24 might vary from the example described earlier without departing from the spirit of the invention. For instance, the diagnostic procedure may include only the steps necessary to perform the proper operation procedure without the steps for performing the continued operation procedure. Alternatively, the diagnostic procedure may include only the steps necessary to perform the continued operation procedure without the steps for performing the proper operation procedure. Objectively, both the proper operation and continued operation procedures are desirable from the standpoint of enhanced safety, however one of them can be omitted while still providing at least some degree of protection against tilt sensor failure.

Figure 2:
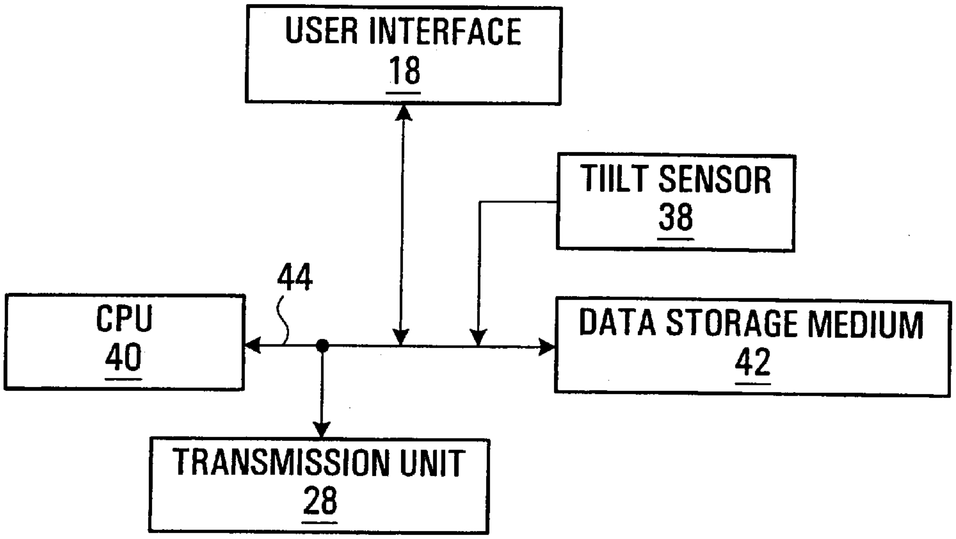
FIG. 2 is a structural block diagram of the portable master controller of the system shown in FIG. 1.

FIG. 2 is a structural block diagram of the portable master controller 12. The portable master controller 12 is largely software implemented and includes a Central Processing Unit (CPU) 40 that connects with a data storage medium 42 over a data bus 44. The data storage medium 42 holds the program element that is executed by the CPU 40 to implement various functional elements of the portable master controller 12, in particular the processing unit 24. Data is exchanged between the CPU 40 and the data storage medium 42 over the data bus 44. Peripherals connect to the data bus 44 such as to send and receive information from the CPU 40 and the data storage medium 42. Those peripherals include the user interface 18, the transmission unit 28 and the tilt sensor 38.

It should be noted that the diagnostic unit 25 (shown in FIG. 1) is implemented in software by the processing unit 24. Alternatively, the diagnostic procedure may be implemented partly in hardware and partly in software or only in hardware.

Figure 3:
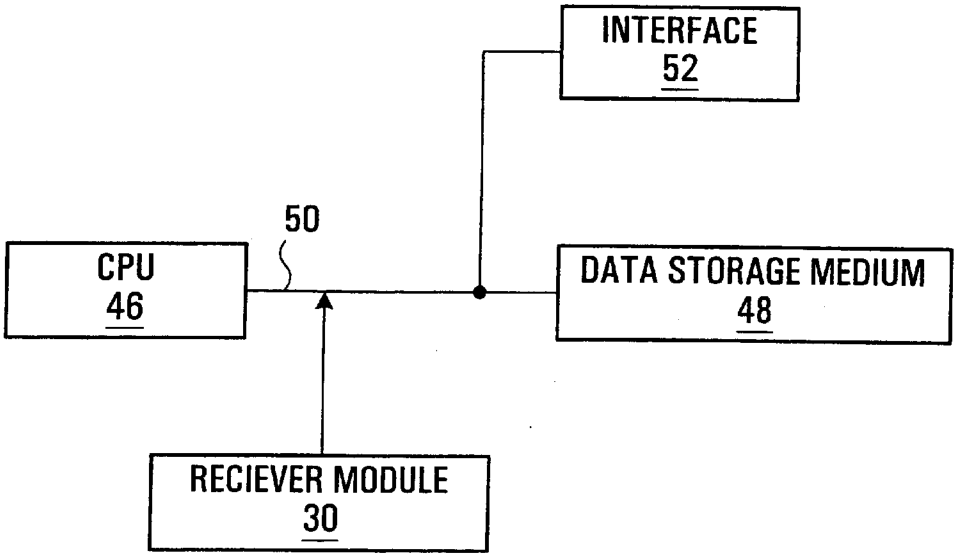
FIG. 3 is a structural block diagram of the slave controller of the system shown in FIG. 1.

FIG. 3 is a structural block diagram of the slave controller 14. As is the case with the portable master controller 12, the slave controller 14 has a CPU 46 connected to a data storage medium 48 with a data bus 50. The data storage medium 48 holds the program element that is executed by the CPU 46 to implement various functional elements of the slave controller 14, in particular the processing module 34. Peripherals connect to the data bus 50 such as to send and receive information from the CPU 46 and the data storage medium 48. Those peripherals include the receiver module 30 and an interface 52 through which the slave controller 14 connects to the locomotive controls.

Although various embodiments have been illustrated, this was for the purpose of describing, but not limiting, the invention. Various modifications will become apparent to those skilled in the art and are within the scope of this invention, which is defined more particularly by the attached claims.

What is claimed is:

1. A master controller for controlling a locomotive having a slave controller mounted on-board, said master controller being operative for generating and transmitting to the slave controller over a wireless link a command signal indicative of an action to be performed at the locomotive, said master controller comprising:

a) a solid state tilt sensor for generating inclination information about said master controller, said master controller being operative for determining if said master controller is in a safe operational condition or in an unsafe operational condition, at least in part on the basis of said inclination information;

b) when said master controller is determined to be in an unsafe operational condition, said master controller being operative for performing a predetermined action.

2. The master controller as defined in claim 1, wherein said predetermined action involves generating an emergency command signal for directing the locomotive to acquire a secure condition, and transmitting said emergency command signal to the slave controller.

3. The master controller as defined in claim 2, wherein the emergency command signal directs the locomotive to stop.

4. The master controller as defined in claim 1, wherein said solid-state tilt sensor includes an accelerometer.

5. The master controller as defined in claim 4, wherein said accelerometer responds to static gravitational acceleration.

6. The master controller as defined in claim 5, wherein said accelerometer generates inclination information that includes a static component representative of the static gravitational acceleration and a dynamic component representative of the dynamic acceleration.

7. The master controller as defined in claim 6, wherein said solid state tilt sensor outputs a signal indicative of the inclination information, wherein said signal is a pulse width modulated signal.

8. The master controller as defined in claim 7, further comprising a processing unit for receiving the signal output by said solid state tilt sensor, said processing unit including a diagnostic unit to detect a malfunction of said tilt sensor.

9. The master controller as defined in claim 8, wherein said diagnostic unit is operative for performing a proper operation procedure.

10. The master controller as defined in claim 9, wherein said proper operation procedure implements a timer to measure a time during which said solid state tilt sensor supplies inclination information to said processing unit indicating that an orientation of said master controller does not change.

11. The master controller as defined in claim 10, wherein said timer defines a maximal time period, when the inclination information supplied by said solid state tilt sensor to said processing unit indicates that the orientation of said master controller has not changed during said maximal time period, said diagnostic unit is operative to send a signal to said solid state tilt sensor to force said solid state tilt sensor to supply inclination information indicating a change of orientation of said master controller.

12. The master controller as defined in claim 9, wherein said diagnostic unit is operative for performing a continued operation procedure.

13. The master controller as defined in claim 12, wherein said solid state tilt sensor generates an output signal indicative of the inclination information, said continued operation procedure including validating the output signal of the solid state tilt sensor.

14. The master controller as defined in claim 13, wherein the validation of the output signal includes observing a characteristic parameter of the output signal.

15. The master controller as defined in claim 14, wherein the characteristic parameter of the output signal is a frequency of the output signal.

16. The master controller as defined in claim 8, wherein when said diagnostic unit detects a malfunction of said solid state tilt sensor, said processing unit being operative for generating an emergency command signal for directing the locomotive to acquire a secure condition and transmit said emergency command signal.

17. A remote control system for a locomotive, comprising:

a) a slave controller mounted on board the locomotive;

b) a master controller that is operable for generating and transmitting to the slave controller over a wireless link a command signal indicative of an action to be performed at the locomotive, said master controller comprising:

i) a solid state tilt sensor for generating inclination information about said master controller, said master controller being operative for determining if said master controller is in a safe operational condition or in an unsafe operational condition at least in part on the basis of said inclination information;

ii) when said master controller is determined to be in an unsafe operational condition said master controller being operative for performing a predetermined action.

18. The remote control system as defined in claim 17, wherein said predetermined action involves generating an emergency command signal for directing the locomotive to acquire a secure condition, and transmitting said emergency command signal to the slave controller.

19. The remote control system as defined in claim 18, wherein the emergency command signal directs the locomotive to stop.

20. The remote control system as defined in claim 17, wherein said solid-state tilt sensor includes an accelerometer.

21. The remote control system as defined in claim 20, wherein said accelerometer responds to static gravitational acceleration.

22. The remote control system as defined in claim 21, wherein said accelerometer generates inclination information including a static component representative of the static gravitational acceleration and a dynamic component representative of dynamic acceleration.

23. The remote control system as defined in claim 22, wherein said solid state tilt sensor outputs a signal indicative of said inclination information, said signal being a pulse width modulated signal.

24. The remote control system as defined in claim 17, further comprising a processing unit for receiving the signal output by said solid state tilt sensor, said processing unit including a diagnostic unit to detect a malfunction of said solid state tilt sensor.

25. A master control unit for a locomotive having a slave controller mounted on-board, said master control unit comprising:

a) a user interface for enabling an operator to enter a certain command;

b) a processing unit in communication with said user interface for generating a command signal based on the certain command entered at said user interface;

c) a transmission unit for transmitting the command signal to the slave controller;

d) a solid state tilt sensor in communication with said processing unit for generating inclination information about said master control unit;

e) said processing unit being operative for determining at least in part on the basis of the inclination information if said master control unit is in a safe operational condition or in an unsafe operational condition;

f) when said master control unit is determined to be in an unsafe operational condition said master control unit being operative for performing a predetermined action.

26. The master control unit as defined in claim 25, wherein said predetermined action involves generating an emergency command signal for directing the locomotive to acquire a secure condition, and transmitting said emergency command signal to the slave controller.

27. The master control unit as defined in claim 26, wherein the emergency command signal directs the locomotive to stop.

28. The master control unit as defined in claim 25, wherein said solid-state tilt sensor includes an accelerometer.

29. The master control unit as defined in claim 28, wherein said accelerometer responds to static gravitational acceleration.

30. The master control unit as defined in claim 29, wherein said accelerometer generates an output signal including a static component representative of the static gravitational acceleration and a dynamic component representative of dynamic acceleration.

31. The master control unit as defined in claim 29, wherein said processing unit includes a diagnostic unit to detect a malfunction of said tilt sensor.

32. The master control unit as defined in claim 31, wherein said diagnostic unit is operative for performing a proper operation procedure.

33. The master control unit as defined in claim 32, wherein said proper operation procedure implements a timer to measure a time during which said solid state tilt sensor supplies inclination information to said processing unit indicating that an orientation of said master controller does not change.

34. The master control unit as defined in claim 33, wherein said timer defines a maximal time period, when the inclination information supplied by said tilt sensor to said processing unit indicates that the orientation of said master controller has not changed during said maximal time period, said diagnostic unit is operative for sending a signal to said tilt sensor to force said tilt sensor to supply inclination information indicating a change of orientation of said master controller.

35. The master control unit as defined in claim 31, wherein said diagnostic unit is operative for performing a continued operation procedure.

36. The master control unit as defined in claim 35, wherein said tilt sensor generates an output signal indicative of the inclination information, said continued operation procedure including validating the output signal of the tilt sensor.

37. The master control unit as defined in claim 36, wherein the validation of the output signal includes observing a characteristic parameter of the output signal.

38. The master control unit as defined in claim 37, wherein the characteristic parameter of the output signal is a frequency of the output signal.

39. The master control unit as defined in claim 31, wherein when said diagnostic unit detects a malfunction of said tilt sensor, said processing unit is operative for generating an emergency command signal to said transmission unit without input from the operator, for directing the locomotive to acquire a secure condition.

* * * * *